(12) United States Patent
Yazaki et al.

(10) Patent No.: US 7,702,175 B2
(45) Date of Patent: Apr. 20, 2010

(54) IMAGE PROCESSING APPARATUS FOR ENHANCING HIGH FREQUENCY COMPONENTS

(75) Inventors: Satoshi Yazaki, Tokyo (JP); Hirofumi Honda, Tokyo (JP)

(73) Assignee: PIONEER Corporation, Tokyo (JP)

(*) Notice: Subject to any disclaimer, the term of this patent is extended or adjusted under 35 U.S.C. 154(b) by 1057 days.

(21) Appl. No.: 11/391,674

(22) Filed: Mar. 29, 2006

(65) Prior Publication Data

US 2006/0228043 A1 Oct. 12, 2006

(30) Foreign Application Priority Data

Mar. 30, 2005 (JP) ............................. 2005-097056

(51) Int. Cl.
*G06K 9/40* (2006.01)

(52) U.S. Cl. ..................... 382/266; 382/254; 382/260; 382/261; 382/274; 382/275

(58) Field of Classification Search ................. 382/254, 382/260, 263
See application file for complete search history.

(56) References Cited

U.S. PATENT DOCUMENTS

| | | | | |
|---|---|---|---|---|
| 5,508,741 A * | 4/1996 | Hieda | ......................... | 348/252 |
| 5,774,599 A * | 6/1998 | Muka et al. | ................. | 382/254 |
| 5,818,972 A * | 10/1998 | Girod et al. | ................. | 382/260 |
| 5,933,540 A * | 8/1999 | Lakshminarayanan et al. | ........................... | 382/260 |
| 6,167,165 A * | 12/2000 | Gallagher et al. | ........... | 382/263 |
| 6,614,944 B1 * | 9/2003 | Levantovsky | ................ | 382/261 |
| 6,856,704 B1 * | 2/2005 | Gallagher et al. | ........... | 382/263 |
| 6,930,676 B2 * | 8/2005 | De Haan et al. | ............. | 345/204 |
| 2002/0076118 A1 * | 6/2002 | Kaji | ........................... | 382/263 |
| 2003/0016879 A1 * | 1/2003 | Slavin | ........................ | 382/261 |
| 2003/0156761 A1 * | 8/2003 | Ogata et al. | ................. | 382/251 |
| 2004/0071361 A1 * | 4/2004 | Asano et al. | ................. | 382/260 |
| 2004/0096103 A1 * | 5/2004 | Gallagher et al. | ........... | 382/167 |
| 2005/0002064 A1 * | 1/2005 | Curry et al. | ................. | 358/3.08 |
| 2005/0058365 A1 * | 3/2005 | Wang et al. | ................. | 382/266 |
| 2005/0190164 A1 * | 9/2005 | Velthoven et al. | ........... | 345/204 |
| 2006/0228043 A1 * | 10/2006 | Yazaki et al. | ............... | 382/275 |
| 2008/0031538 A1 * | 2/2008 | Jiang et al. | ................... | 382/261 |

FOREIGN PATENT DOCUMENTS

JP 2000-4380 1/2000

* cited by examiner

*Primary Examiner*—Bhavesh M Mehta
*Assistant Examiner*—Gandhi Thirugnanam
(74) *Attorney, Agent, or Firm*—McGinn IP Law Group, PLLC (57) ABSTRACT

An image processing apparatus receives an input image signal and performs an enhancement process on a high frequency component included in the input image signal based on a low frequency component of the input image signal. The apparatus extracts a low frequency component from the input image signal and combines a step variation component of the input image signal with the low frequency component to generate a combined wave component. The apparatus performs an enhancement process on the high frequency component obtained by removing the combined wave component from the input image signal.

5 Claims, 7 Drawing Sheets

PRIOR ART

PRIOR ART

IMAGE PROCESSING APPARATUS FOR ENHANCING HIGH FREQUENCY COMPONENTS

BACKGROUND OF THE INVENTION

1. Field of the Invention

The present invention relates to an image processing apparatus which performs image processing on an input image signal, which is brightness values input at intervals of a constant period of time, based on the frequency of the brightness change of the input image signal to improve a visual effect and other effects.

2. Description of the Related Art

The image display method and apparatus described in Japanese Patent Laid-Open Publication Kokai No. 2000-4380 are configured to be able to improve the contrast of an image display without increasing the circuit size by using an infinite impulse response (IIR) filter as a low pass filter.

Figure 1:
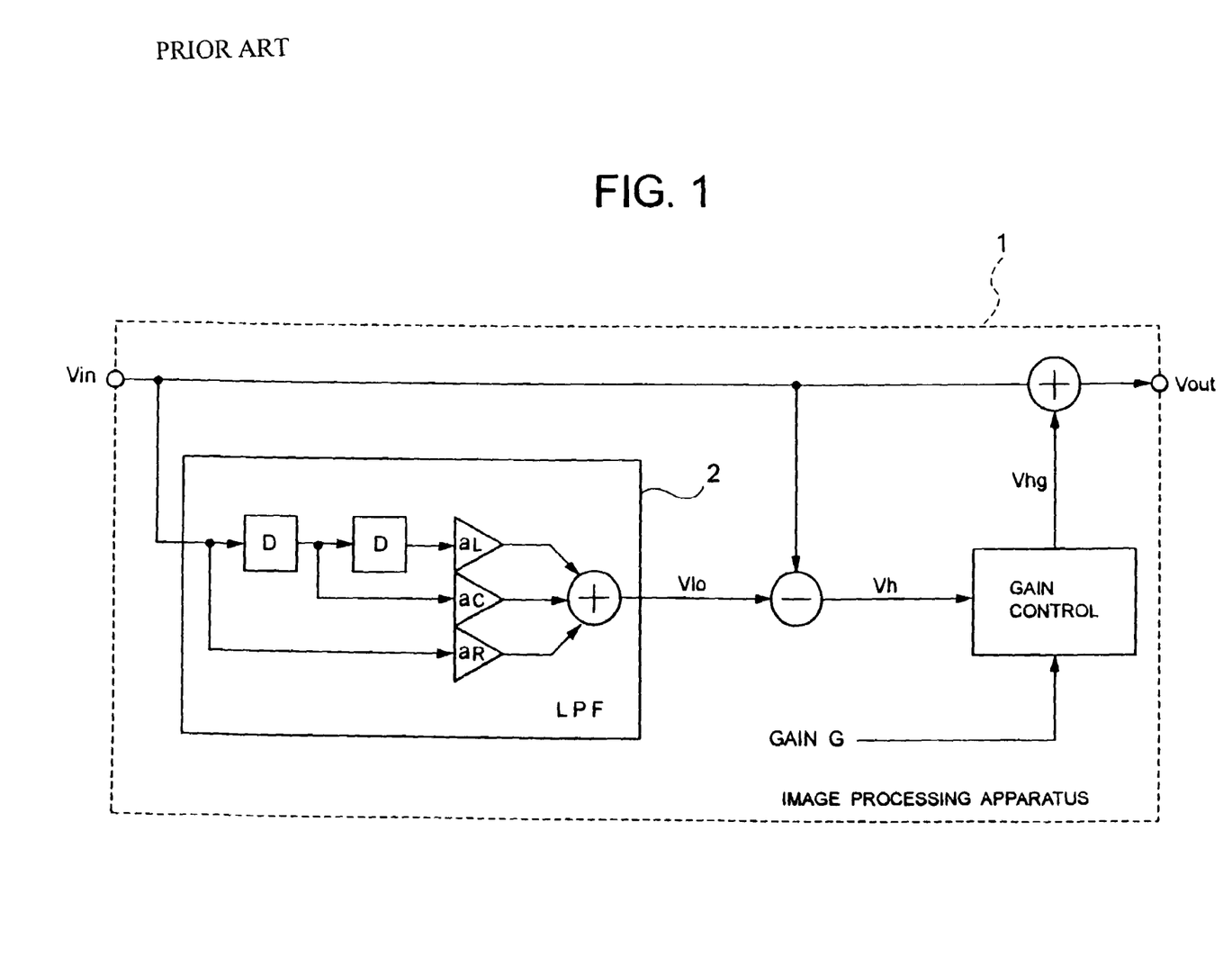
FIG. 1 is a block diagram showing the configuration of a conventional image processing apparatus.

To improve image visual effects, such as contrast, on an image, a low pass filter comprising a finite impulse response (FIR) filter that is more stable than an IIR filter is typically used. FIG. 1 shows an image processing apparatus 1 which performs a high-frequency region intensification or enhancement process (hereinafter, referred to as "sharpening process") to improve the visual fineness of an image by using a FIR filter as a low pass filter. In FIG. 1, a low frequency component $V_{lo}$ of an input image $V_{in}$ is extracted by a low pass filter (LPF) 2, and is subtracted from the input image $V_{in}$, thereby extracting a high frequency component $V_h$ of the input image $V_{in}$. Subsequently, a gain G is multiplied to the high frequency component $V_h$ and then a high frequency component $V_{hg}$ multiplied by the gain G is added back to the input image $V_{in}$, thereby obtaining an output image $V_{out}$ on which the sharpening process has been performed. When the LPF 2 is configured as, for example, a FIR filter with three taps, two pixels L and R on both sides of the center pixel C are used as evaluation pixels to calculate a brightness value of the output image. That is, the pixels L and C obtained by combining a plurality of delay elements and the pixel R are multiplied by corresponding tap coefficients $a_L$, $a_C$, and $a_R$ by multipliers and then summed by an adder, whereby the brightness (gradation) of the output image is calculated. The three tap coefficients $a_L$, $a_C$, and $a_R$ corresponding to the three pixels have respective fixed values determined from the cut-off frequency. This implies that the summation by the adder can be regarded as a process of mixing the brightness values of pixels with one another under a fixed mixture ratio.

Figure 2:
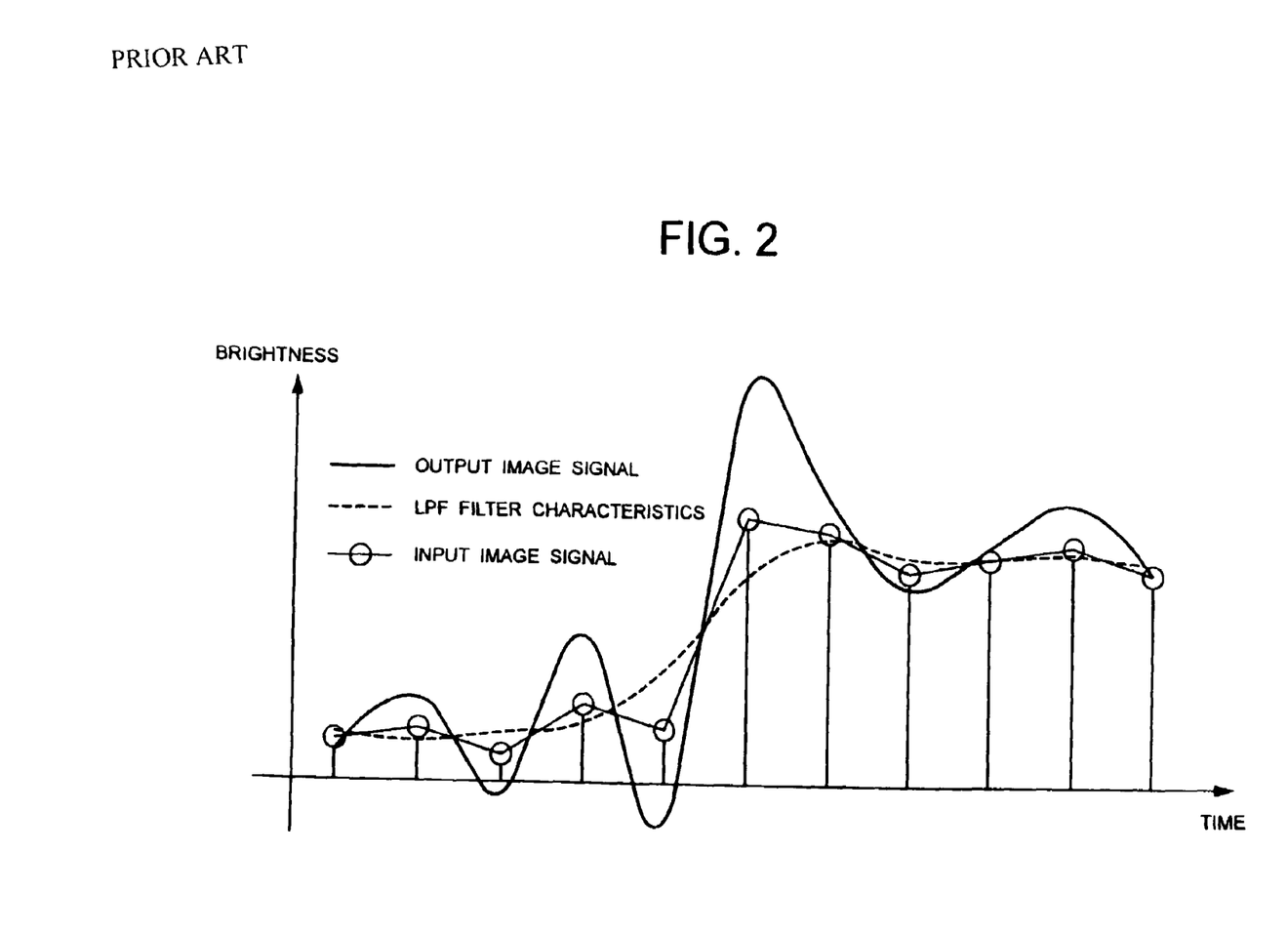
FIG. 2 is a graph showing sharpening process characteristics of the conventional image processing apparatus.

In a method using such conventional LPFs, however, if an image includes a steep gradation change or a step input, like from zero to the maximum or vice versa between adjacent pixels, a phenomenon occurs in which the image on which a sharpening process has been performed becomes significantly different from the original one around the region where such gradation change occurs. Referring to FIG. 2, sharpening process characteristics of a conventional image processing apparatus is shown. As is shown in FIG. 2, in the brightness values of an output image signal on which a sharpening process has been performed, a large overshoot occurs around the region where a step response occurs in the brightness values of an input image signal, which are input at intervals of a predetermined period of time. This is caused by the digital signal processing of LPFs that cannot track a step input. Therefore, although the sharpening process can improve the fineness of an entire image, the problem of severely damaging the original image occurs as an adverse effect.

SUMMARY OF THE INVENTION

The present invention is directed to solve problems, including the above problem as an example, and has as its object to provide an image processing apparatus which can prevent an adverse effect of a sharpening process, that is, a phenomenon in which an original image is impaired.

The image processing apparatus according to the present invention receives an input image signal, performs an enhancement process on a high frequency component included in the input image signal on the basis of a low frequency component of the input image signal, and comprises: a combined wave component generator that extracts the low frequency component from the input image signal and combines a step variation component of the input image signal with the low frequency component to generate a combined wave component; and an enhancement processor that performs an enhancement process on the high frequency component obtained by removing the combined wave component from the input image signal.

DETAILED DESCRIPTION OF THE INVENTION

Embodiments of the present invention will now be described in detail with reference to the accompanying drawings.

First Embodiment

Figure 3:
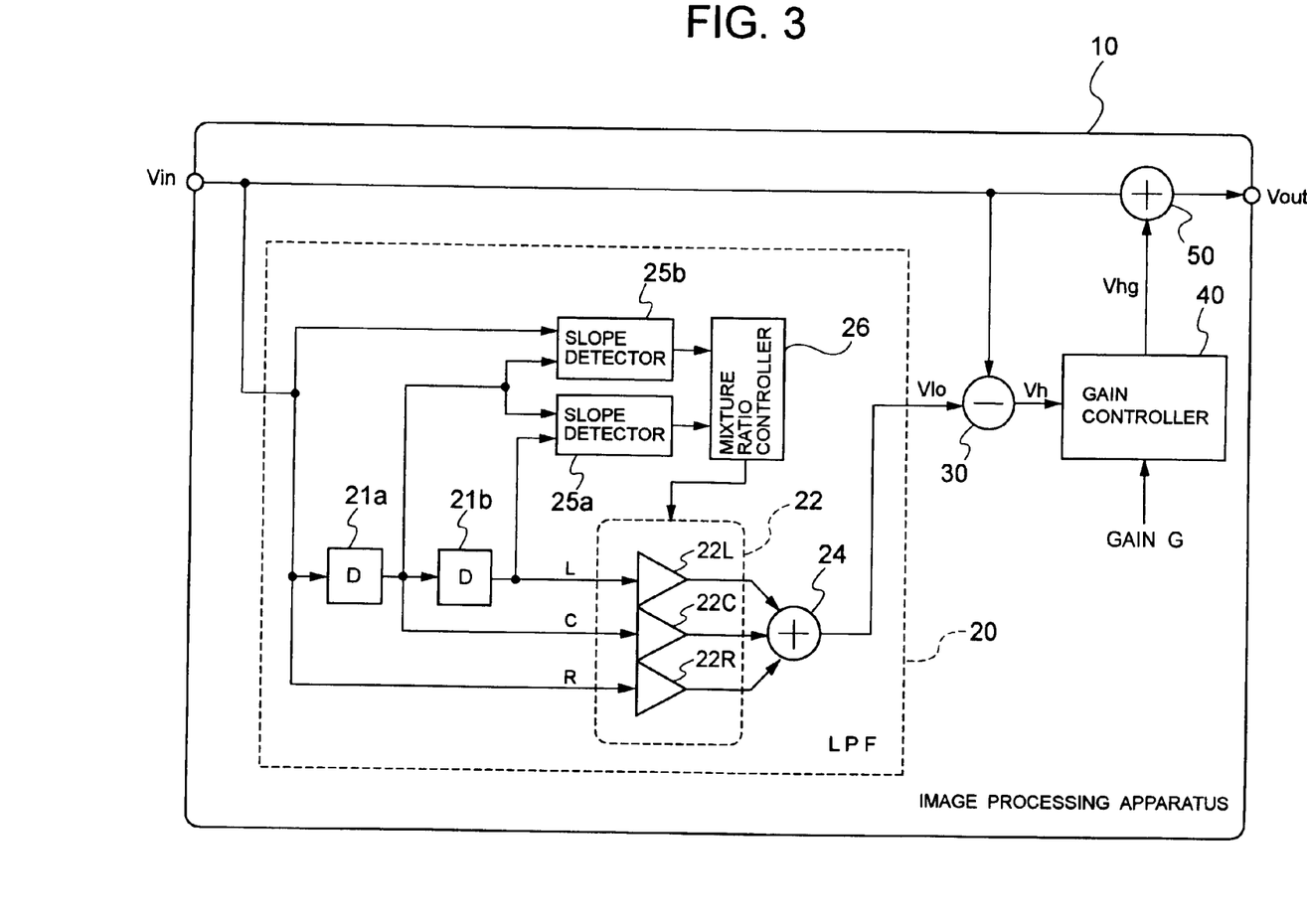
FIG. 3 is a block diagram showing the configuration of the image processing apparatus including a one-stage LPF according to a first embodiment of the invention.

Referring to FIG. 3, a first embodiment of the present invention is an image processing apparatus 10, wherein an input image signal $V_{in}$, which comprises brightness values generated at a constant cycle D, is input to the image processing apparatus 10 as an input image signal and an output image signal $V_{out}$ on which a sharpening process has been performed is output. The input image signal $V_{in}$ and output image signal $V_{out}$ are brightness values indicating, for example, 0 to 255 gradation levels. The cycle D has a value of, for example, approximately 40 nsec, assuming an operation of repeating one-dimensional image data 30 times per second, which is enough for scanning 1280×720 two-dimensional image data.

The input image signal $V_{in}$ is input not only to a LPF 20 but also to a subtracter 30 and an adder 50. The subtracter 30 subtracts a low frequency component $V_{lo}$ output from the LPF 20 from the received input image signal $V_{in}$, and outputs a high frequency component $V_h$ to a gain controller 40. The gain controller 40 multiplies the received high frequency component $V_h$ by a predetermined gain G to obtain a gain-multiplied high frequency component $V_{hg}$, which is output to the adder 50. The adder 50 adds the gain-multiplied high frequency component $V_{hg}$ to the input image signal $V_{in}$ and outputs the result as the output image signal $V_{out}$ to external circuits. The LPF 20 is a low pass filter that receives the input image signal $V_{in}$ and outputs the low frequency component $V_{lo}$ determined by a predetermined cut-off frequency. The input image signal $V_{in}$ is input to a multiplier 22R in a multiplier group 22, a delay element 21a, and a slope detector 25b. The delay element 21a delays the received input image signal $V_{in}$ by an amount corresponding to time D, and outputs the delayed signal to a slop detector 25a, the slop detector 25b, a delay element 21b, and a multiplier 22C in the multiplier group 22. The delay element 21b further delays the received input image signal $V_{in}$, which has been delayed by the time D, by an amount corresponding to the time D, and outputs the delayed signal to the slop detector 25a and a multiplier 22L in the multiplier group 22. The brightness value of the input image signal $V_{in}$ delayed by the time 2D set by the delay elements 21a and 21b is denoted by $V_{inL}$ as an input brightness value corresponding to a pixel L; the value of the input image signal $V_{in}$ delayed by the time D set by the delay element 21a is denoted by $V_{inC}$ as an input brightness value corresponding to a pixel C; and the value of the input image signal $V_{in}$ without delay is denoted by $V_{inR}$ as an input brightness value corresponding to a pixel R.

The multiplier group 22 includes the multipliers 22L, 22C, and 22R having respective multiplication values or tap coefficients (hereinafter, referred to as "mixture coefficients") $a_L$, $a_C$, and $a_R$, which are specified by a mixture ratio controller 26. The multipliers 22L, 22C, and 22R multiply the input brightness values $V_{inL}$, $V_{inC}$, and $V_{inR}$ by the respective mixture coefficients $a_L$, $a_C$, and $a_R$ and output the results. The outputs from the multipliers 22L, 22C, and 22R are added together by an adder 24 and are output as the low frequency component $V_{lo}$. The low frequency component $V_{lo}$ describing a brightness value is therefore given by the following equation.

$$V_{lo} = a_L \cdot V_{inL} + a_C \cdot V_{inC} + a_R \cdot V_{inR}$$

The slope detector 25a receives the input brightness values $V_{inL}$ and $V_{inC}$, obtains the slope $\Delta_{LC}$ between the two values, and outputs the result to the mixture ratio controller 26. The slope detector 25b receives the input brightness values $V_{inC}$ and $V_{inR}$, obtains the slope $\Delta_{CR}$ between the two values, and outputs the result to the mixture ratio controller 26. The slopes $\Delta_{LC}$ and $\Delta_{CR}$ are therefore given by the following equations.

$$\Delta_{LC} = V_{inC} - V_{inL}$$

$$\Delta_{CR} = V_{inR} - V_{inC}$$

The mixture ratio controller 26 calculates the tap coefficients or the mixture coefficients $a_L$, $a_C$, and $a_R$ based on the slopes $\Delta_{LC}$ and $\Delta_{CR}$ output from the slope detectors 25a and 25b, respectively, and outputs the results to the multiplier group 22, thereby controlling the mixture ratio. The mixture coefficients $a_L$, $a_C$, and $a_R$ are calculated by, for example, the following equations.

$$a_L = a_{L0} \times 2f(\Delta_{CR})/(f(\Delta_{LC}) + f(\Delta_{CR}))$$

$$a_C = a_{C0}$$

$$a_R = a_{R0} \times 2f(\Delta_{LC})/(f(\Delta_{LC}) + f(\Delta_{CR}))$$

In the above equations, $a_{L0}$, $a_{C0}$, and $a_{R0}$ are tap coefficients determined in the ordinary FIR filter design based on the cut-off frequency. The coefficients $a_{L0}$, $a_{C0}$, and $a_{R0}$ have values of, for example, 0.25, 0.5, and 0.25, respectively. The function $f(\Delta)$ is an arbitrary monotonically increasing function such as, for example, $f(\Delta)=|\Delta|$, $f(\Delta)=\Delta^2$, or $f(\Delta)=\log(\Delta)$.

The mixture control based on the above mixture coefficients implies that it is performed so as to reduce the mixture ratio of the brightness values on the side of having a steeper slope and at the same time to increase the mixture ratio of the brightness values on the side of having a more gradual slope. The LPF 20 thereby outputs a combined wave component as the low frequency component $V_{lo}$, in which a step variation component is added to a low frequency component extracted by an ordinary LPF.

The calculations of the mixture coefficients $a_L$, $a_C$, and $a_R$ are not restricted to use of the above equations, but any equations may be used that can reduce the mixture ratio of the brightness values on the side of having a steeper slope and at the same time can increase the mixture ratio of the brightness values on the side of having a more gradual slope.

Second Embodiment

Figure 4A:
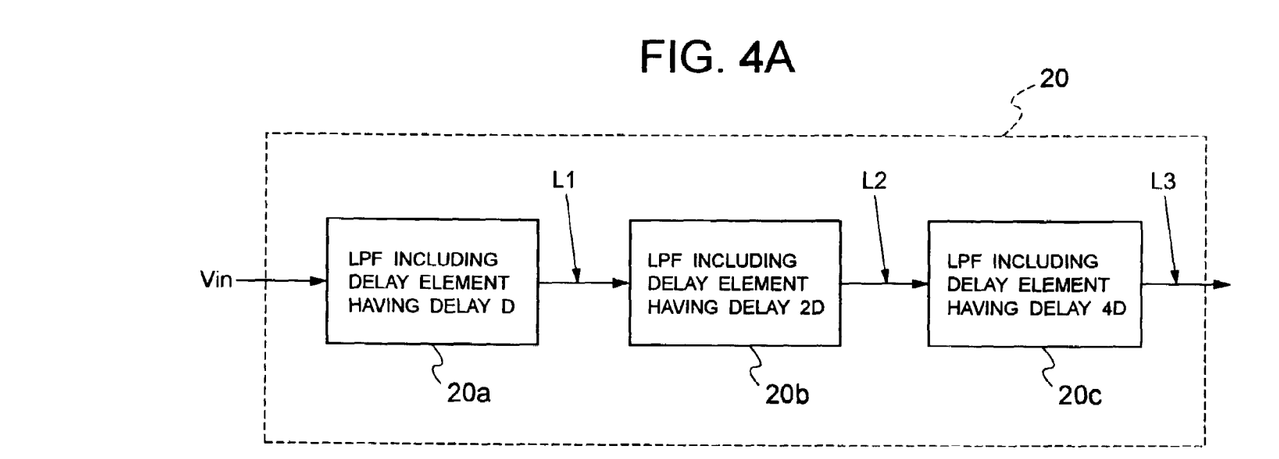
FIGS. 4A and 4B are block diagrams showing a multi-stage LPF according to a second embodiment of the invention.
Figure 4B:
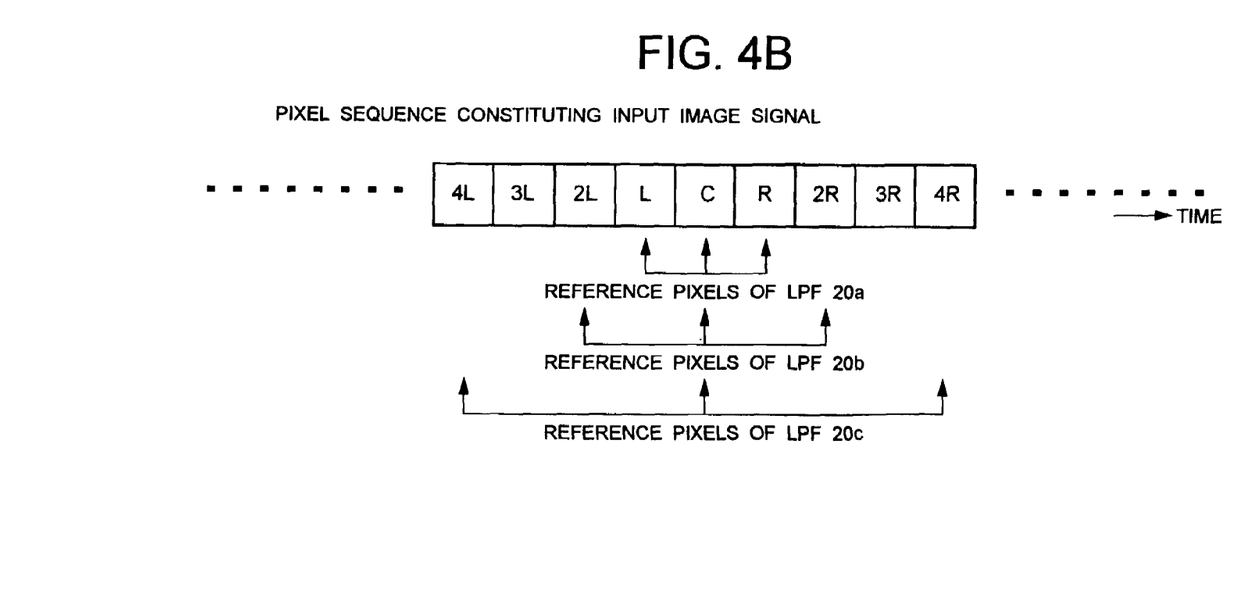

Referring to FIGS. 4A and 4B, a second embodiment of the present invention is an image processing apparatus in which the LPF included in the image processing apparatus shown in FIG. 3 is configured with a multi-stage structure. Referring to FIG. 4A, the LPF 20 comprises a plurality of filters, LPF 20a, LPF 20b, and LPF 20c, connected in cascade. The LPF 20a is a 3-tap low pass filter in which the delay time of delay elements is set to a predetermined cycle D, thereby having the pixels L, C, and R as reference pixels. The LPF 20b is a 3-tap low pass filter in which the delay time of delay elements is set to a predetermined cycle 2D, thereby having the pixels 2L, C, and 2R as reference pixels. The LPF 20c is a 3-tap low pass filter in which the delay time of delay elements is set to a predetermined cycle 4D, thereby having the pixels 4L, C, and 4R as reference pixels. The pixels 4L to L, C, and R to 4R are each aligned on the time line with the predetermined cycle D as shown in FIG. 4B.

The output brightness value of the LPF 20a receiving the input image signal $V_{in}$ is denoted by L1, that of the LPF 20b receiving the output brightness value L1 by L2, and that of the LPF 20c receiving the output brightness value L2 by L3. If it is assumed that each of the LPFs 20a to 20c has the same set of the tap coefficients such as, for example, $a_{L0}$=0.25, $a_{C0}$=0.5, $a_{R0}$=0.25, the frequency bands or cut-off frequencies of the LPFs at the stages L1, L2, and L3 have a relation of lower<L3<L2<L1<higher.

Figure 5A:
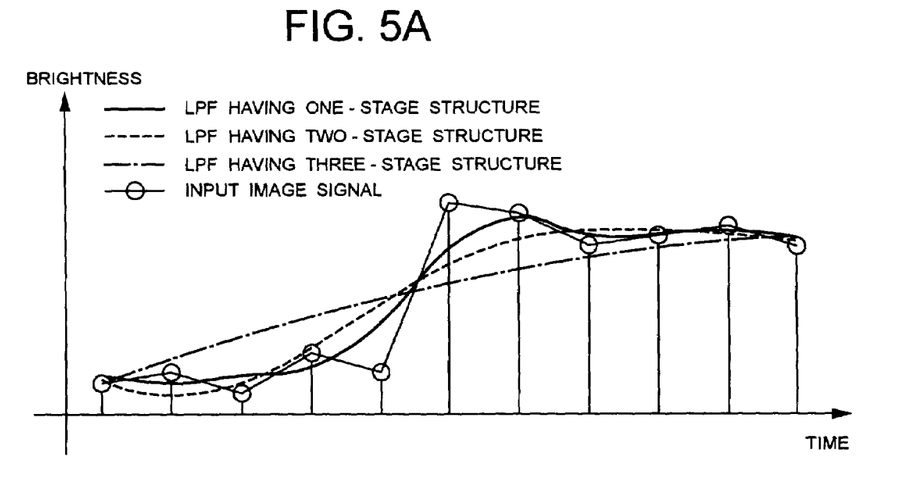
FIGS. 5A and 5B show filter output characteristics of the conventional image processing apparatus and that according to the present invention.
Figure 5B:
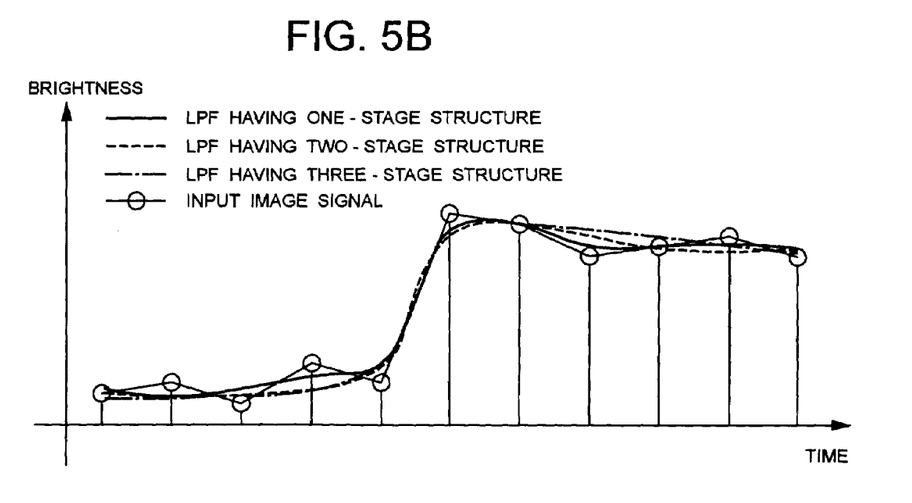

FIGS. 5A and 5B show the filter output characteristics of both of the conventional image processing apparatus and the image processing apparatus of the present invention. Referring to FIG. 5A, the variations of the brightness values, occurring when a conventional LPF is used, are shown. The output from the first stage filter (corresponding to L1 in FIG. 4A), shown by a solid line, shows an expected typical smooth characteristic in response to a step variation of the input brightness values (shown by circles in the drawing). The output from the second stage filter (corresponding to L2 in FIG. 4A) shown by a broken line, shows a smoother characteristic because the frequency band narrows and shifts toward lower frequencies. Similarly, the output from the third stage filter (corresponding to L3 in FIG. 4A), shown by a chain line, shows a much smoother characteristic. It is thus recognized that the conventional LPF cannot preserve the step response of the input brightness values.

Referring to FIG. 5B, the variations of the brightness values, occurring when the LPF of the present invention is used, are shown. The outputs, either from the first stage filter (L1 in FIG. 4A), shown by a solid line, or from the second stage filter (L2 in FIG. 4A), shown by a broken line, or from the third stage filter (L3 in FIG. 4A), shown by a chain line, show the characteristics which track the step variation of the input brightness values (circles in the drawing). It is also recognized that, in the region other than the step variation region, smoothing is properly performed according to the number of filter stages as in the conventional LPF. It is thus appreciated that the LPF of the present invention not only can track a step variation of the input brightness values, but also obtain a sufficient step variation tracking characteristic even in a multi-stage structure in which cut-off frequency lowers.

Figure 6A:
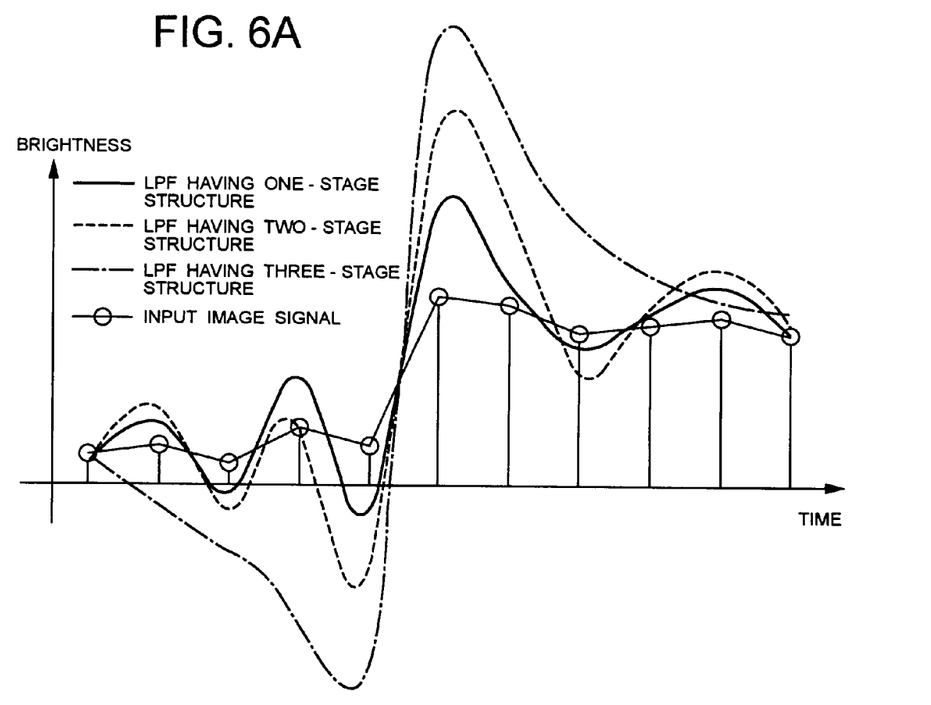
FIGS. 6A and 6B show sharpening process output characteristics of the conventional image processing apparatus and that according to the present invention.
Figure 6B:
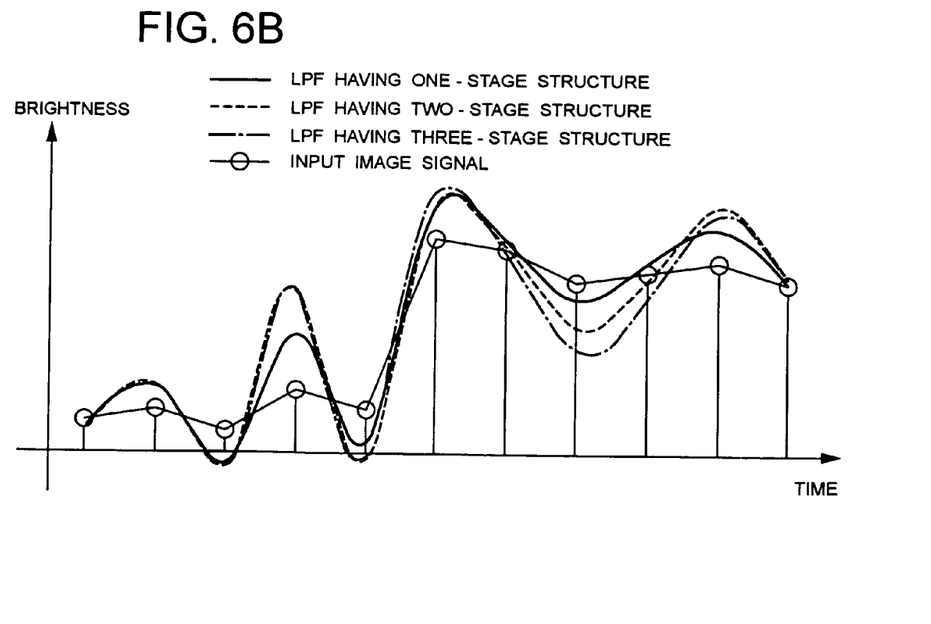

FIGS. 6A and 6B shows sharpening process output characteristics of both the conventional image processing apparatus and the image processing apparatus of the present invention. Referring to FIG. 6A, the output results of a sharpening process based on the conventional LPFs are shown, in which excessive overshoots occur in response to a step variation of the input brightness values (shown by circles in the drawing). It is noticed that this tendency becomes more pronounced as the number of LPF stages is increased.

Figure 7:
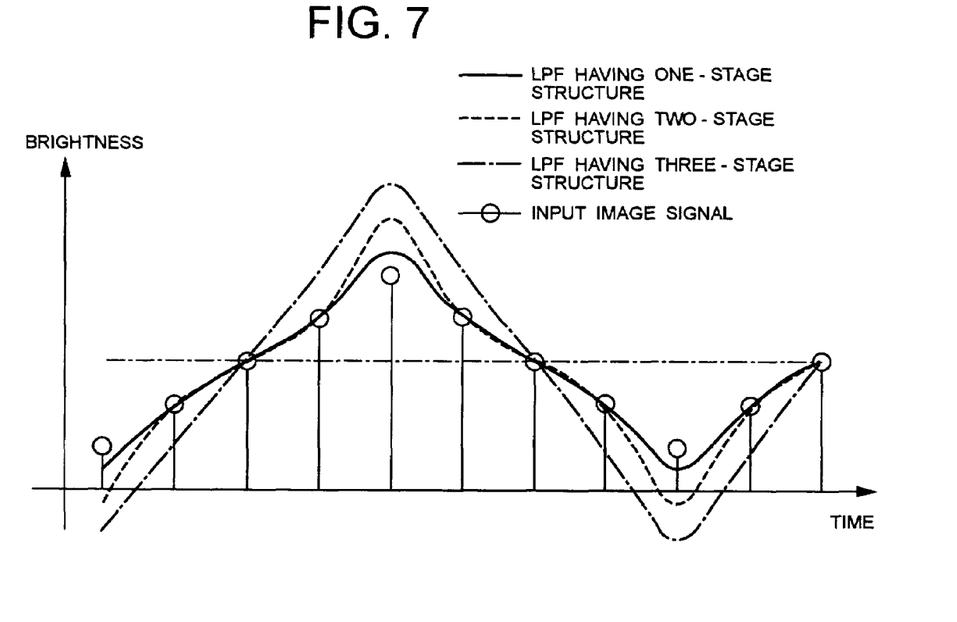
FIG. 7 shows sharpening process output characteristics of the image processing apparatus of the invention, obtained in the time range where a step response does not occur.

Referring to FIG. 6B, the output results of a sharpening process based on the LPFs of the present invention are shown. As shown in FIG. 6B, the sharpening process of the one-stage structure can obtain an output shown by a solid line, in which sharpening is achieved to intensify or enhance the brightness variation and, in addition, an overshoot occurring in response to a step variation is suppressed. The sharpening process of the two-stage structure can obtain an output shown by a broken line, in which the sharpening is achieved to further enhance the brightness variation and also the overshoot occurring in response to the step variation is suppressed. The sharpening process of the three-stage structure can obtain an output shown by a chain line, in which the sharpening is achieved to furthermore enhance the brightness variation and also the overshoot occurring in response to the step variation is suppressed. That is, the sharpening process can improve the fineness of an entire image while suppressing the conventionally problematic overshoot occurring around a step response region FIG. 7 shows sharpening process output characteristics of the image processing apparatus of the present invention, obtained in the time range where a step variation does not occur. In response to the input brightness values having a mountain shape variation (shown by circles in the drawing), the sharpening process of the one-stage structure obtains an output result shown by a solid line, which is similar to the one obtained in the conventional sharpening process that enhances a variation in response to the input having a mountain shape. The sharpening processes of the two-stage and three-stage structures also obtain output results shown by respective broken and chain lines, which are similar to the one obtained in the conventional sharpening process that enhances a variation in response to the input having a mountain shape.

Accordingly, as in the conventional apparatus, the image processing apparatus of the present invention can improve the effect of fineness, which is a purpose of the sharpening process, even in the time range where the input image has no step variation.

Figure 8:
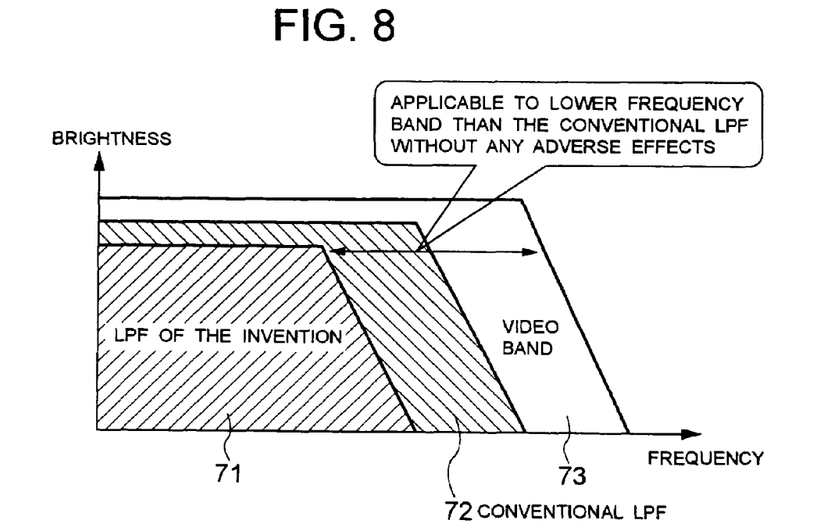
FIG. 8 shows an application range of the image processing apparatus of the invention.

FIG. 8 shows the applicable range of the image processing apparatus of the present invention, wherein frequency ranges of an input image signal include a frequency band 73 of a video signal, a frequency band 72 of a conventional low pass filter, and a frequency range 71 of the low pass filter of the present invention.

Assuming the frequency band 72 of the conventional low pass filter, the applicable range of a sharpening process is restricted to the region obtained by removing the frequency band 72 from the region of the frequency band 73. Assuming the frequency band 71 of the low pass filter of the present invention, however, the applicable range of the sharpening process is extended to the wider region obtained by removing the frequency band 71 from the region of the frequency band 73. This implies that the sharpening process can be applied to a signal having a wide frequency band including a lower frequency range.

As is clear from the above embodiments, according to the image processing apparatus of the present invention, the sharpening process can improve the fineness of an entire image in the same extent as the conventional apparatus while suppressing an excessive overshoot occurring around a step response region in an image, which is an adverse effect of the sharpening process. Further, when the frequency band to which a sharpening process is applied is widen to enhance the sharpening effect by configuring an LPF with a multi-stage structure, only the fineness of an image can be improved without increasing the adverse overshoot.

The present invention has been described with reference to the preferred embodiments. Those skilled in the art will recognize that further variations and modifications are possible within the scope of the appended claims.

The present application is based on Japanese Patent Application No. 2005-097056, the content of which is herein incorporated by reference.

What is claimed is:

1. An image processing apparatus receiving an input image signal and performing an enhancement process on a high frequency component included in the input image signal based on a low frequency component of the input image signal, the image processing apparatus comprising:

a combined wave component generator which comprises a Finite Impulse Response (FIR) filter, wherein the FIR filter extracts a first brightness value, a second brightness value, and a third brightness value from the input image signal at respective predetermined cycles, multiplies the first, second, and third brightness values by respective predetermined mixture coefficients, and adds the multiplied results together to output a combined wave component, the FIR filter comprising: a slope detector which detects a first slope value between the first and second brightness values and a second slope value between the second and third brightness values; and a mixture coefficient controller which controls a ratio of the mixture coefficients of the first and third brightness values such that after comparing the first slope value with the second slope value, the mixture ratio of the brightness values on the side of having a more gradual slope value is increased and the mixture ratio of the brightness values on the side of having a steeper slope value is decreased; and an enhancement processor which performs an enhancement process on the high frequency component obtained by removing the combined wave component from the input image signal.

2. The image processing apparatus according to claim 1, wherein the mixture coefficient controller calculates a value of a first function monotonically increasing with the first slope value and a value of a second function monotonically increasing with the second slope value and having the same shape as the first function, and controls the ratio of the mixture coefficients of the first and third brightness values such that: a mixture coefficient corresponding to the first brightness value is at least doubled from a predetermined value of the mixture coefficient with a ratio of the second function value with respect to the sum of the first and second function values; and a mixture coefficient corresponding to the third brightness value is at least doubled from a predetermined value of the mixture coefficient with a ratio of the first function value with respect to the sum of the first and second function values.

3. The image processing apparatus according to claim 2, wherein
both the first and second functions are functions that specify an absolute value of a slope value, a square value of a slope value, or a logarithmic value of a slope value.

4. The image processing apparatus according to claim 1, wherein
the combined wave component generator comprises multi-stage low pass filters which sequentially extract low frequency components of the input image signal.

5. The image processing apparatus according to claim 4, wherein cut-off frequencies of the multi-stage low pass filters are sequentially decreased as the stage number of the multi-stage low pass filters increases.

* * * * *